United States Patent [19]
Tweed, Jr. et al.

[11] Patent Number: 4,594,570
[45] Date of Patent: Jun. 10, 1986

[54] ELEVATOR CONTROL

[75] Inventors: George C. Tweed, Jr.; Richard C. McCarthy, both of Simsbury, Conn.

[73] Assignee: Otis Elevator Company, Farmington, Conn.

[21] Appl. No.: 442,391

[22] Filed: Nov. 17, 1982

[51] Int. Cl.$^4$ ............................................. B66B 3/02
[52] U.S. Cl. ................................. 340/21; 340/19 R; 340/20
[58] Field of Search ........................ 340/19 R, 20, 21

[56] References Cited

U.S. PATENT DOCUMENTS 3,782,504 1/1974 Billmaier et al. ............. 340/19 R X
4,376,930 3/1983 Sasso .................................. 340/20 X Primary Examiner—John W. Caldwell, Sr.
Assistant Examiner—Michael F. Heim
Attorney, Agent, or Firm—Robert E. Greenstien

[57] ABSTRACT

An operational controller is located in the elevator car, and a mobile transceiver, also located in the car, is connected to the operational controller, which includes a microprocessor that controls the transceiver. A stationary transceiver is located in the lobby, and the two transceivers are connected over two pairs of wires in the traveling cable. These transceivers communicate by dual tone combinations, each combination identifying a hall button, a hall lantern, and a position indicator in the lobby.

11 Claims, 2 Drawing Figures

ELEVATOR CONTROL

TECHNICAL FIELD

This invention relates to elevators, and, in particular, communicating calls in elevators, and controlling button lights, lanterns and position indicators.

BACKGROUND ART

In the typical elevator, hall call buttons, button lamps and lanterns are connected by many wires to an operational controller, which is usually located in the machine room, usually at the top of the building, in the basement, or on the first floor in a hydraulic elevator. The operational controller is linked to the elevator car by a traveling cable, and this cable, which dangles below the car, contains a great number of wires over which information is communicated between the car and the operational controller concerning car calls and other car operations, such as door opening functions. As a result, the amount of wire is quite extensive, and any reduction can provide significant cost savings. Moreover, a reduction in the size of the traveling cable will reduce the load, reducing power consumption. In fact, one reason the operational controller is not located in the car is to limit the weight of the traveling cable.

Telemetry techniques, using lasers, microwaves or nondirectional RF, theoretically could be used in an elevator to communicate this information, but this is not as easy as it may seem. An elevator is a comparatively hostile environment for data transmission, containing moving metallic parts, such as wires, rails and cables, which would cause interference, and considerable dust and dirt, which could interfere with optical systems. There is also a lot of RFI (radio frequency interference) from sources in the building because the hoistway is not shielded. Perhaps at considerable expense these problems could be overcome, but certainly not without increasing substantially the complexity of the equipment, making it far more difficult to service. Furthermore, these approaches may actually introduce into the building RFI that could interfere with other equipment, such as computers. Even with a telemetry system, a certain amount of hard-wiring would be required to provide redundancy and meet safety requirements. In short, telemetry approaches for elevators are appealing, but not practical.

Nevertheless, major advantages can be obtained by reducing the amount of wire in the system and the weight of the elevator car, by reducing the size of the traveling cable and the other wires in the system over which information is transferred. Moreover, if it were possible to locate the operational controller in the car, but without increasing the car's size or weight, less space would be required in the machine room, and even less wire would be needed in the system, especially in the traveling cable.

DISCLOSURE OF INVENTION

An object of the present invention is to provide an elevator in which communication between the elevator car and other portions of the system occurs over a minimum number of wires.

Another object of the present invention is to provide an elevator in which the operational controller may be located in the elevator car, and communications between the controller and the remainder of the elevator takes place over a traveling cable having as few conductors as possible.

According to one aspect of the present invention, an elevator, for providing service among a plurality of floors in a building, has a stationary transceiver and, on the car, a mobile transceiver. The stationary transceiver is connected to the hall call buttons, the hall call activation displays, button lights, car position display and hall lanterns. A hall call button, when activated, causes the stationary transceiver to transmit a signal, comprising different frequency signals (e.g. two tones), to the mobile transceiver. The mobile transceiver receives these two tones, decodes them, and then provides a signal which is used for registering the type of service associated with the tone combination. Once the call is registered, the mobile transceiver transmits the same two tones back to the stationary transceiver. The stationary transceiver then decodes the signal and activates the hall button display, indicating that the call has been registered. The mobile transceiver also provides a tone based signal to the stationary transceiver, which, in response, activates a position display indicating the car position. When the car approaches the floor to answer the service request, the mobile transceiver sends out the same two tones with a deactivation signal, and the stationary transceiver, upon receiving these two signals, simultaneously deactivates the hall button display. At the same time, the mobile transceiver sends out another signal, also comprising two different frequency signals (e.g. also two tones) which identify the hall lantern, and the stationary transceiver, upon receiving this signal, decodes it and activates the hall lantern, indicating that the car is at the floor.

According to one aspect of the invention, the two transceivers are A.C. coupled to the two pairs of wires, but the deactivation signal is applied in common mode to one pair of wires, and the stationary transceiver is responsive to this common mode voltage level of those wires for deactivating the hall button activation display.

According to another aspect of the invention, the operational controller for the elevator is located in the elevator car and receives the decoded information from the mobile transceiver and the car call buttons for controlling elevator operation. The computer registers the decoded calls that are received by the mobile transceiver and controls the mobile transceiver to control the production of signals that are sent to the stationary transceiver to control the hall lantern and hall button activation display, providing, as a result, primary communication, concerning hall call service requests and hall lantern operation, over merely as few as two wires (preferably four) in the traveling cable.

According to another aspect of the invention, the operational controller may be located, not in the car, but in the machine room, and the car may contain a car transceiver to transmit a car call request signal and receive car position display signals, comprising two different frequency signals, on a pair of wires in the traveling cable.

According to another aspect of the invention, when a hall button is actuated to register a call, a first switch is operated to activate a tone generator which generates the signal (the two different frequency signals) associated with the call button, and that signal is sent to the mobile transceiver, which echoes the signal back after the call is registered. The echoed-back signal (comprising those two different frequencies) is received by a stationary transceiver which decodes it and operates a second switch that turns off and inhibits the first switch, causing the signal from the stationary transceiver to be discontinued, and that supplies the light or display associated with the button. Consequently, continuous depression of the hall call button does not lock out all other calls from the stationary transceiver to the mobile transceiver over the two wires; only during the short interval of time before the echo signal is returned are other hall call signals locked out.

A principal feature of the present invention is that by significantly reducing the amount of wire required in the system, especially in the traveling cable, significant cost and weight reduction is now practical. It also makes possible locating a microprocessor control in the car.

Other objects and features of the invention will be apparent to one skilled in the art from the following description.

BEST MODE FOR CARRYING OUT THE INVENTION

Figure 1:
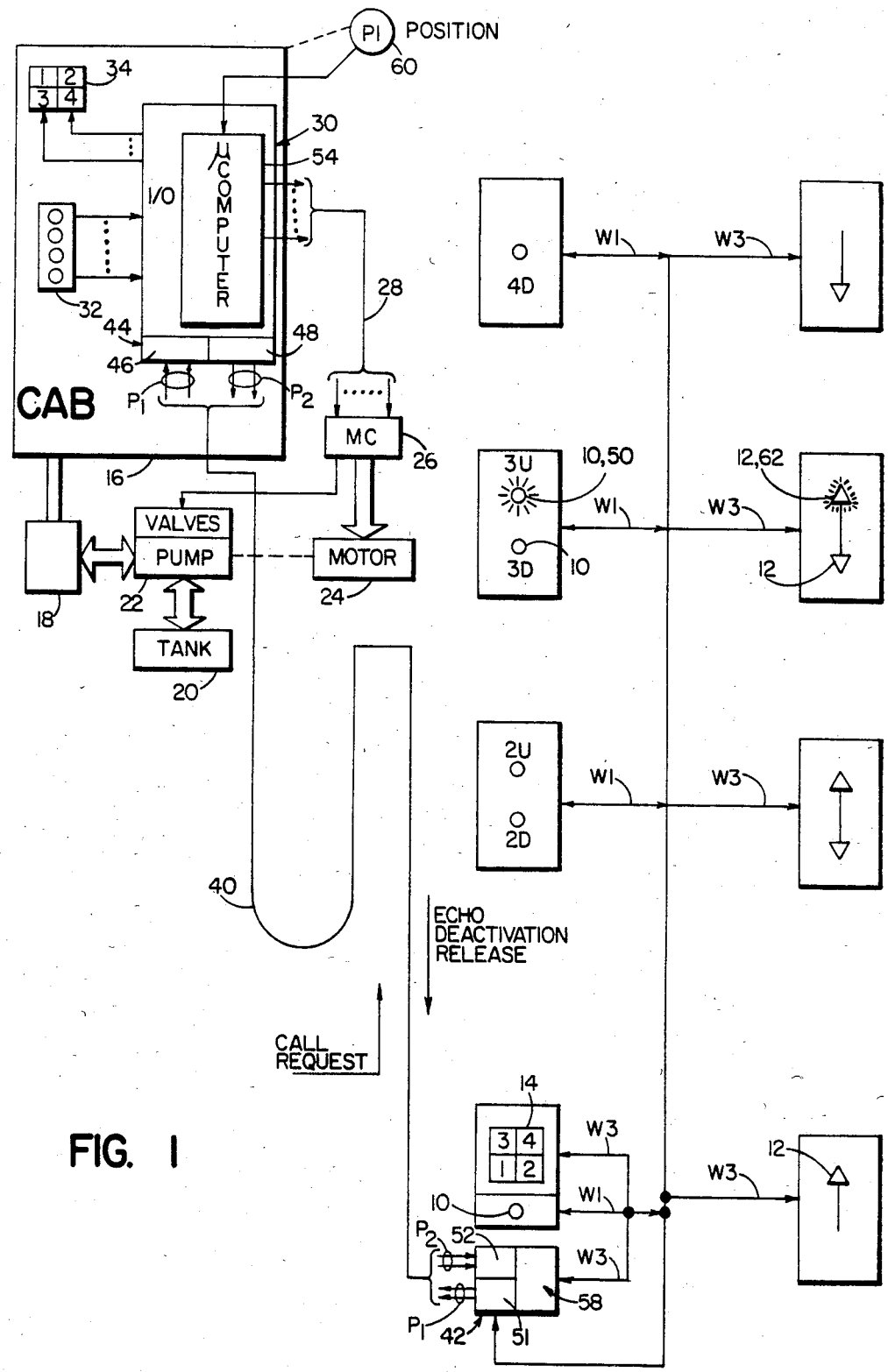
FIG. 1 is a block diagram of a hydraulic elevator system which embodies the present invention.

The present invention may be used in a hydraulic elevator or a traction elevator, and FIG. 1 shows a hydraulic elevator which provides service between four floors. On each floor there are customary fixtures. There is a hall button 10 which is depressed to request either down service or up service (e.g. 2d, 2u) at the floor, and the button 10 also includes a light (not visible in FIG. 1) for indicating that the call requested by depressing the button has been registered. There is also a hall lantern (arrow) 12 which indicates, when a car stops at the floor, what direction it is moving in. And, on the first floor (lobby) there is a car position indicator 14, and also a hall button and lamp 10 for the lobby.

In a typical fashion, the elevator cab 16 is connected to a hydraulic actuator 18, and this actuator is moved up and down in response to fluid flow between the actuator and a tank 20, and that flow is controlled by a motor 24, controlled by a motor control 26. The motor control receives signals over a line 28 from an operational controller 30, located in the elevator cab 16, and the elevator cab includes car buttons 32 and a car mounted car position indicator (floor numerals) 34, and these, too, are also connected to the operational controller 30 for entering car calls and for indicating the location or position of the car in the building.

A traveling cable 40 connects the operational controller with a wall-mounted, stationary transceiver 42, which, in this embodiment, houses the position indicator 14 and the hall button 10 located in the lobby. This traveling cable 40 comprises four wires—two wire pairs P1 and P2. Pair P1 carries control signals on the hall call requests from the stationary transceiver 42 to the operational controller. Pair P2 carries control signals on call registration, button control and lantern control from the operational controller to the stationary transceiver. Each of those control signals on the pairs P1 and P2 comprises two signals (e.g. two dual tones); for each hall button, each hall lantern and each digit or numeral in the car position display 14 in the lobby there is a unique signal—a unique two-signal (e.g. dual tone) combination which identifies the device.

The operational controller includes a mobile transceiver 44 comprising a mobile tone generator (signal transmitter) 48 and a mobile receiver (or tone decoder) 46, and, similarly, the stationary transceiver 42 comprises a stationary generator or signal transmitter 51 and a stationary receiver or tone decoder 52. The stationary generator 51 supplies the control signals (dual tones) over the lines P1, and those signals are received and decoded by the mobile receiver 46. Likewise, the mobile generator 42 provides the control signals (dual tones) over the lines P2, and those signals are received and decoded by the stationary receiver 52.

Each button is connected to the stationary transceiver over a line W1; and each lantern over a line W3.

When a hall call is made by depressing a button, for example at the button 50 on the third floor, to call the car up, the button actuates the generator 51 to provide a dual tone, call request signal on the line P1. The call request signal is received by the mobile receiver 46 which decodes it to provide a signal which identifies that an up call has been registered at the third floor. That signal is provided to a microcomputer 54 in the car and part of the operational controller. In response to that signal, which indicates a call on the third floor, the microcomputer registers the call, after which it instructs and commands the mobile transmitter 48 to retransmit or echo back the call request signal over the lines P2. That echo signal is the same as the call request signal, and when it is received by the stationary receiver 52, the stationary receiver 52 decodes the echo signal and provides a drive signal to activate a hall button display drive 58. This drive 58 has separate sections (inputs and outputs) for each lantern, button lamp and position numeral, and in response to the drive signal to the input for the button 50, for example, the corresponding output for the light 82 (for button 50) is latched to illuminate the light. Each section in this drive is independently released, that is, a release signal is provided to the common release or unlatch terminal and the drive signal is also applied, for light 82, for instance, the drive to light 82 will be removed. The drive signal also inhibits (blocks out) the control that the button 50 has over the stationary transmitter 50. In other words, even if the button 50 continues to be depressed, the call request signal will not be transmitted on the line P1. Hence, the line P1 is only "blocked out" from other calls on other buttons for the very short time required to receive the echo signal (e.g. 50 ms.)

A car position indicator or transducer PI60 is connected to the car 16 and the microcomputer. Using information from this car position indicator 60, the microcomputer commands the mobile generator 48 to provide a car position signal on the lines P2. The car position signal is received and decoded by the stationary receiver 52, which provides a position indicator signal that actuates the driver 58 to illuminate a numeral of the display 14 to indicate the car's location.

When the call is answered, e.g. the car approaches or is about to stop at the third floor and perhaps the doors begin to open, the microcomputer commands the mobile generator 48 to provide a hall lantern activation signal on the line P2. This lantern activation signal comprises a dual tone pair which identifies the lantern 62, on the third floor. When this lantern activation signal is received by the stationary receiver 58, it is decoded and a lantern drive signal is provided to the input on the driver 58 for lantern 62, and this activates the lantern 62, providing occupants of the floor with the customary indication that the car has arrived. At the same time, the microcomputer 54 commands the mobile transmitter 48 to provide two signals in order to cause the button lamp associated with the button 50 to go off. One of these signals comprises the echo signal—in other words, the two tones that identify the hall button 50 out of all the other buttons in the building. The other signal, a light deactivation signal, is not a tone but a signal common to both of the wires P2, preferably a common mode or floating signal, such as a common mode voltage applied to the wires. The stationary receiver 52 is responsive to this common mode signal to cause the drive 58 to be released, reset, in other words, unlatched; in response to it, the receiver provides the release signal to the drive. However, the portion of the drive 58 which is deactivated is determined by the echo signal (the tones address or identify the section of the drive to be released). When received, the drive signal is applied to the input on drive 58 for the lamp in button 50 by the receiver. But, when the deactivation signal and the echo signal are simultaneously received, the light 82, associated with the button 50 and the echo signal, is turned off. The advantage to this is clear: a single dual pair has plural functions: identify a call that is registered and identify the lamp that should be turned on and off. Only one deactivation signal is needed, because the echo signal acts as the address. As a result, the four floor building that is shown should require only sixteen tone combinations to all control hall lanterns, hall button lights, receive and register calls. As few as two wires may be used in the traveling cable, but four is preferred. One may be used, if additional circuitry for independent receive and transmit modes between the mobile transceiver and the stationary transceiver is included, to prevent simultaneous blocking (communication over the same pair of wires). But, since this would increase the complexity of the system substantially, thereby eliminating any real benefit from the reduction in the size of the traveling cable, four is the preferred number of wires. Four wires (two pairs) provides a significant reduction in the number of wires in the traveling cable by comparison to typical systems, because all the complex wiring, between the stationary transceiver, the lanterns, and the hall buttons, which is normally in the traveling cable, has been removed.

Figure 2:
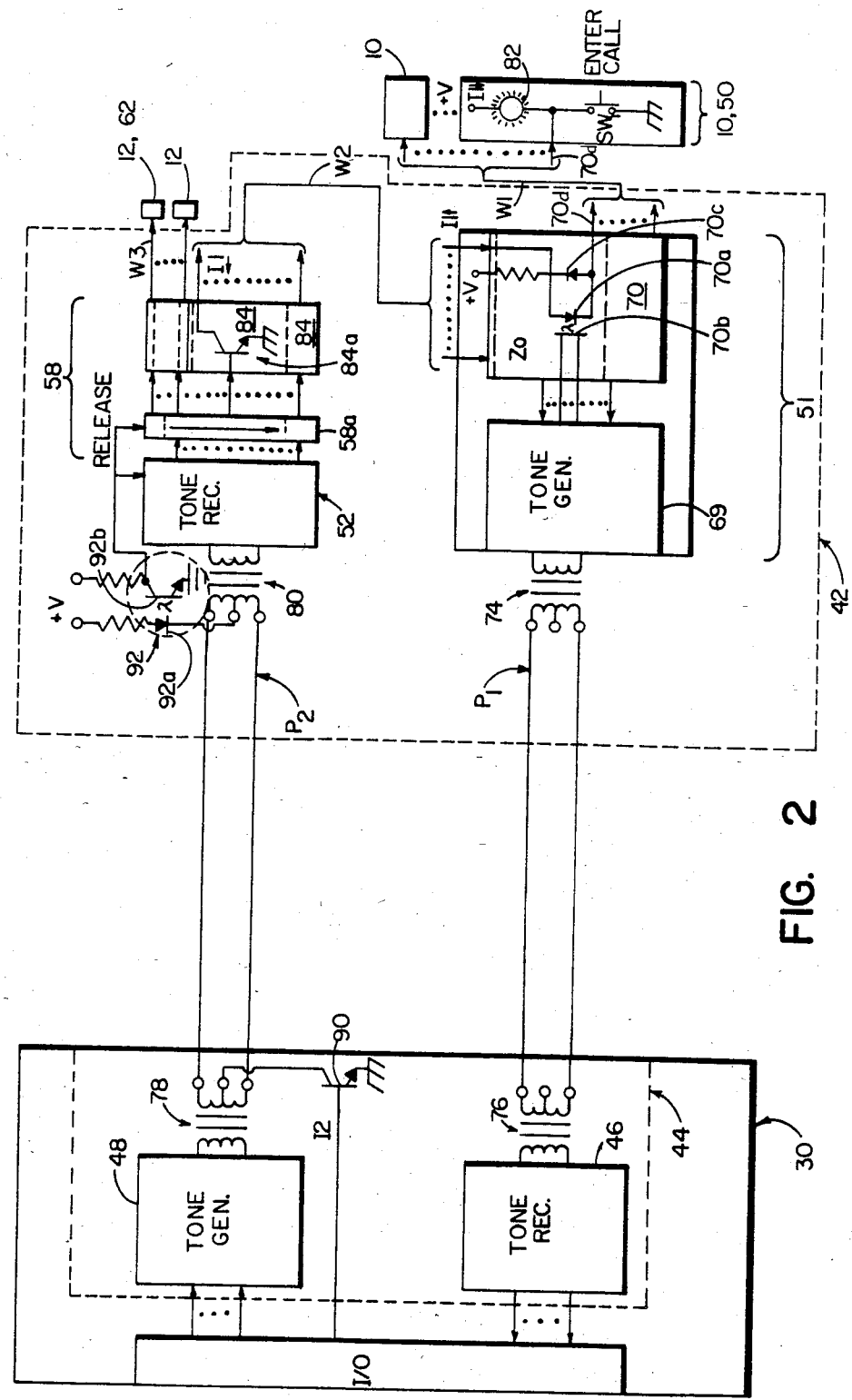
FIG. 2 is a block diagram of a dual tone communication arrangement in that system.

FIG. 2 provides additional detail on the operation of the transceiver. When the button 50 is depressed to make a hall call (ENTER CALL), this actuates an opto-isolated FET switch 70, assigned to the button 50 (there is one for each button), and this causes a tone generator 51 to provide the call request signal. When button 50 is depressed, a switch SW1 is closed. That causes current to flow from a voltage supply +V through a light emitting diode 70a, which, in turn, causes the FET transistor 70b to conduct, thereby providing a signal to activate the tone generator 51. The generator 51a is A.C. coupled through a transformer 74 to the line P2, and the line P2 is A.C. coupled through a transformer 76 to a mobile receiver 46, in the car. Likewise, the mobile tone generator 48 is A.C. coupled over a transformer 78 to the line 48 which is A.C. coupled to a stationary receiver 52 by a transformer 80. As stated previously, the mobile tone generator provides the echo signal which is decoded by the stationary tone receiver 52 in order to turn on a light, the light 82, associated with the button 50 after it is depressed. The echo signal, as stated, blocks out production of the call request signal by the transmitter 50. When the echo signal is decoded by the stationary receiver, the tone receiver provides the drive signal on one of the lines 52a to turn on a section of the latching drive 58, which, in response, provides a signal that turns on a transistor switch 84, associated with the button 50. This switch (there is one for each button) comprises a transistor 84a, which is connected to a silicon diode 70c, which is connected across the diode 70a. When the transistor 84a is turned on, the current flows from the +V supply through the diode 70c, thereby turning off (reverse biasing) the diode 70a, and this turns off the FET 70b, causing the generator 51 to stop providing the call request signal. When this happens, the transistor 84a pulls current I1 through the light 82 (associated with the button 50) through the line 70d, and, thus, as long as it is latched on (as long as the driver 58 is latched on), the light 82 is illuminated. But, it is important to observe that even if the button 50 continues to be depressed, the diode 70a cannot illuminate, and thus the call request signal associated with the button 50 cannot be sent again, that is unless the transistor 84a is turned off, which occurs only after the echo signal and deactivation signal are supplied simultaneously and the drive 58 is released.

The echo signal contains the two tones which identify the button 50 out of all the other buttons in the elevator. As discussed previously, when it is received by the stationary tone receiver 52, it is decoded and a signal is provided to the driver 58 to cause it to be released from its latched state. However, as pointed out, for this to occur, the driver must also receive a latch release signal, and this is provided in response to the deactivation signal in this manner. The deactivation signal is generated in response to an output from the microcomputer 54; it causes a transistor 90 in the mobile transceiver to conduct. This transistor is connected to the center-tap terminal in the transformer 78, also in the car. The center tap of the transformer 80, which is in the stationary transceiver, is connected to a voltage supply +V through transistor switch 92. When the transistor 90 is turned on (which happens, for instance, in response to a signal from the microprocessor when the car is at the floor as the doors are about to open), current is pulled through the pair P1, through the center taps on the transformers 78 and 80, and that current flows from the +V supply through a resistor in series with an LED 92a in the switch 92. The diode illuminates, which causes a transistor 92b to turn on. This transistor draws current from the +V supply through a resistor to produce a voltage drop across the resistor, and the drop registers as the latch release signal on the driver release terminal. Hence, while the echo signal is applied across the pair P2, the switch 92 is also turned on by a signal common to the wires in the pair.

The operational controller has been shown as being located in the elevator car, because the present invention makes that particularly easy and attractive. In most systems, the operational controller is stationary. This is not a problem in a traction system because a traction system typically has a large machine room at the top of the shaft. But, a hydraulic elevator is "space saving" and there is no machine room. Thus, being able to locate the operational controller and especially delicate electronic equipment in the car, is particularly attractive; one reason being that it makes it easier to service the elevator. The invention makes this possible and practical because only four wires are needed in the traveling cable for most control functions for the elevator. But, obviously, the operational controller could be stationary and car call generators and car position indicator signals could be transmitted over the traveling cable using tone combinations. In other words, each car call button and each car call display could have its own two-tone identifier. This arrangement would also reduce the number of wires required in the traveling cable, but it is considered preferable to take full advantage of the invention and locate the operational controller in the car.

The prior art pertaining to elevators is replete with microprocessor techniques for controlling elevator operation, and so detail on that is unnecessary. Tone encoding and decoding is also well known, but it is particularly attractive because recent semiconductor technology has produced small, compact tone generators and receivers; for instance, the model MK5094 generator and MK5103 receiver manufactured by Mostek. As taught in the Mostek application notes, that receiver is preferably used with a band splitter, such as the model S3525A available from AMI. Those particular Mostek devices provide sixteen channels using sixteen dual tone combinations, making them directly usable in a four-story building. Quite obviously, those devices can be stacked to provide service to more than four floors. But it is worth mentioning that the typical hydraulic elevator usually provides service to four floors or less, and thus those devices make it particularly attractive to use the invention in a hydraulic elevator. There are numerous ways to provide the "latched drive" provided by the driver 58. For instance, the model ULN2803A drive, available from Sprague, can be used with the latch control model MC14099B, available from Motorola.

Various modifications of the invention have been described, and this will suggest, to one skilled in the art, even other modifications and variations within the true scope and spirit of the invention.

We claim:

1. An elevator for servicing a plurality of floors in a building:
   a car;
   a car drive for propelling the car;
   a controller for controlling the operation of the car;
   a hall call button on a floor for requesting service to the controller;
   a hall button light associated with the button for indicating a hall call request;
   a hall lantern on the floor for indicating the assignment of the car to the registered call, characterized by;
   a stationary transceiver comprising:
   means for providing a first signal that comprises two signals in response to the operation of said button, said first signal identifying the service request and the button;
   means for activating the light in response to a second signal comprising said two signals and deactivating said light in response to said second signal and a third signal;
   means for activating said lantern in response to a fourth signal comprising two tones identifying the lantern;
   a mobile transceiver, on the car, comprising:
   means for registering a service request in response to said first signal;
   means for providing said second signal after the request is registered;
   means for providing said second signal and said third signal when the request is answered;
   means for providing said fourth signal when the request is answered;
   a first pair of wires connecting said transceivers for carrying said first signal; and
   a second pair of wires connecting said transceivers for carrying said second, third and fourth signals.

2. An elevator according to claim 1, characterized in that said third signal is in common mode to one pair of wires and said mobile transceiver includes means for applying said third signal in common mode to said pair of wires.

3. An elevator according to claim 2, characterized in that:
   said transceivers are A.C. coupled through transformers to the pairs of wires; and
   said stationary transceiver comprises an opto-isolated transistor switch wherein the light source is responsive to the common mode voltage on the input lines connected to one of the transformers.

4. An elevator according to claim 3, characterized in that:
   said transformers have center-tap terminals;
   said mobile transceiver comprises a transitor operated to draw current through the center-tap terminal of the transformers coupling the second pair of wires to the transceivers to provide a voltage on each wire in the pair relative to ground.

5. An elevator according to claim 4, characterized in that said voltage is a D.C. voltage.

6. An elevator according to claim 5, characterized by:
   a car position display on a floor;
   said mobile transceiver further comprises means for providing on said second pair of wires a fifth signal comprising two signals that identify the car position; and
   said stationary transceiver further comprises means for activating a numeral in the display in response to said fifth signal.

7. An elevator according to claim 1, characterized by:
   a car position display on a floor, and in that,
   said mobile transceiver further comprises means for providing a fifth signal, comprising two tones that identify the car position, on said second pair of wires; and
   said stationary transceiver further comprises means for activating the display indicating the car position in response to said fifth signal.

8. An elevator according to claim 1, characterized by:
   a first switch activated by said button to cause said first signal to be provided; and
   a second switch for being latched into a latched state in response to said second signal to provide a signal that maintains the first switch in a deactivated state, and for being released from said latched state in response to said second and said third signals.

9. An elevator according to claim 8, characterized in that said second switch, when in the latched state, provides power to said hall button light.

10. An elevator according to claim 9, characterized by:
    said first switch comprising an optically isolated transistor with a lgiht emitting diode (LED);
    a diode with its anode connected to the cathode of the LED and its cathode connected to the anode of the LED;

a voltage source connected to said button to provide voltage to operate the LED when the button is operated, and connected to said second switch to provide forward bias voltage across said diode to provide current therethrough when the second switch is activated.

11. An elevator characterized by:

a mobile transceiver on the car for receiving and transmitting dual tone signals;

a stationary transceiver for receiving and transmitting dual tone signals;

a traveling cable which comprises first and second pairs of wires connecting the two transceivers;

a call button on each floor;

a lantern on each floor;

a call button light on each floor;

said stationary transceiver comprising:

a first dual tone generator to provide a first dual tone signal on one of the pairs of wires in response to a signal provided when the call button is operated, said dual tone signal identifying said button;

a first switch which is operated by the call button on a floor to provide said signal to activate said first dual tone generator;

a first dual tone receiver for receiving dual tone signals over the second pair of wires;

a second switch latched on in response to a light activation signal provided by said first dual tone receiver in response to said first dual tone signal, said switch providing power to the button light and providing a signal that inhibits said first switch, said second switch being releasable in response to a release signal and said activation signal;

a third switch for providing said release signal in response to a common mode voltage on said second pair of wires;

a fourth switch operated in response to a lantern activation signal provided by said first dual tone receiver in response to a second dual tone signal on the second pair of wires, said second dual tone signal identifying said lantern;

said mobile transceiver comprising:

a second dual tone receiver for receiving and decoding said first signal on said first pair of wires and providing a signal identifying the call button;

a second dual tone generator for providing said first signal and said second signal on said second pair of wires.

* * * * *